United States Patent [19]

DeMarco et al.

[11] Patent Number: 5,566,314
[45] Date of Patent: Oct. 15, 1996

[54] FLASH MEMORY DEVICE EMPLOYING UNUSED CELL ARRAYS TO UPDATE FILES

[75] Inventors: Robert W. DeMarco, Township of Hanover, Morris County; Peter A. A. Dempsey, Morris Plains; Chandan Sarkar, Wharton, all of N.J.

[73] Assignee: Lucent Technologies Inc., Murray Hill, N.J.

[21] Appl. No.: 114,553

[22] Filed: Aug. 30, 1993

[51] Int. Cl.$^6$ .................................................. G06F 13/00
[52] U.S. Cl. ...................... 395/430; 395/412; 395/421.11
[58] Field of Search ........................... 395/425, 430, 395/412, 421.11

[56] References Cited

U.S. PATENT DOCUMENTS 5,126,808  6/1992  Montalvo et al. ...................... 257/202
5,341,339  8/1994  Wells ...................................... 365/218
5,437,020  7/1995  Wells et al. ............................. 395/425

OTHER PUBLICATIONS

N. Kannan, "Technique Extends EEPROM Life," *EDN*, (Nov. 7, 1991), p. 275.

*Primary Examiner*—David L. Robertson
*Attorney, Agent, or Firm*—Lester H. Birnbaum

[57] ABSTRACT

Disclosed is a circuit and method for utilizing FLASH devices as nonvolatile storage elements. Information is modified by adding a new block of data at another location in the memory rather than writing over the outdated information. An address pointer locates the latest information for each data file.

16 Claims, 3 Drawing Sheets

FLASH MEMORY DEVICE EMPLOYING UNUSED CELL ARRAYS TO UPDATE FILES

BACKGROUND OF THE INVENTION

This invention relates to the utilization of FLASH memories.

FLASH memories are relatively recent devices which have the electrical erase capability of an EEPROM (Electrically Erasable and Programmable Read Only Memory), but with a higher density and lower cost since they generally comprise a single MOS device per cell.

In a typical use of a FLASH device for nonvolatile storage (i.e., information is retained through power outages), a predetermined number of rows or columns of cells can be erased and rewritten to store new data. One drawback of such devices is that repeated erasures of the same cells can result in permanent failure of the MOS devices constituting those cells as, for example, when the floating gate of the MOS device develops a permanent positive potential which keeps the cell always "ON". (For a discussion of FLASH memories see, for example, U.S. Pat. No. 5,126,808 issued to Montalvo et al.)

In standard EEPROM devices, it has been proposed to extend the life of the memory by dividing the total memory into banks with some locations reserved for bank pointers. After a certain number of write cycles in one bank, the data is moved to another bank and the bank pointer is incremented to indicate the bank now in use. (See Kannan, "Technique Extends EEPROM Life," *EDN*, p. 275 (Nov. 7, 1991).

SUMMARY OF THE INVENTION

The invention, in one aspect, is a circuit comprising a nonvolatile FLASH memory device including arrays of memory cells. Means are provided for writing a plurality of first data files into a number of said arrays of cells. Means are also provided for storing a series of pointers, each locating the position of the cell array which includes a particular one of the first files. Means are also included for writing a new data file at a previously unused cell array in order to update information in one of the first data files. Means are also provided for modifying the pointer locating the updated first file to locate the new file.

In accordance with another aspect, the invention is a method for writing and storing information in a nonvolatile FLASH memory device including arrays of memory cells. The method comprises writing a plurality of first data files into a number of said arrays of cells. A series of pointers is stored, each locating the position of the cell array including a particular one of the first files. A new data file is written at a previously unused cell array in order to update the information in one of the first data files. The pointer locating the updated file is then modified to locate the new file.

BRIEF DESCRIPTION OF THE DRAWING

These and other features of the invention are delineated in detail in the description to follow. In the drawing.

DETAILED DESCRIPTION

Figure 1:
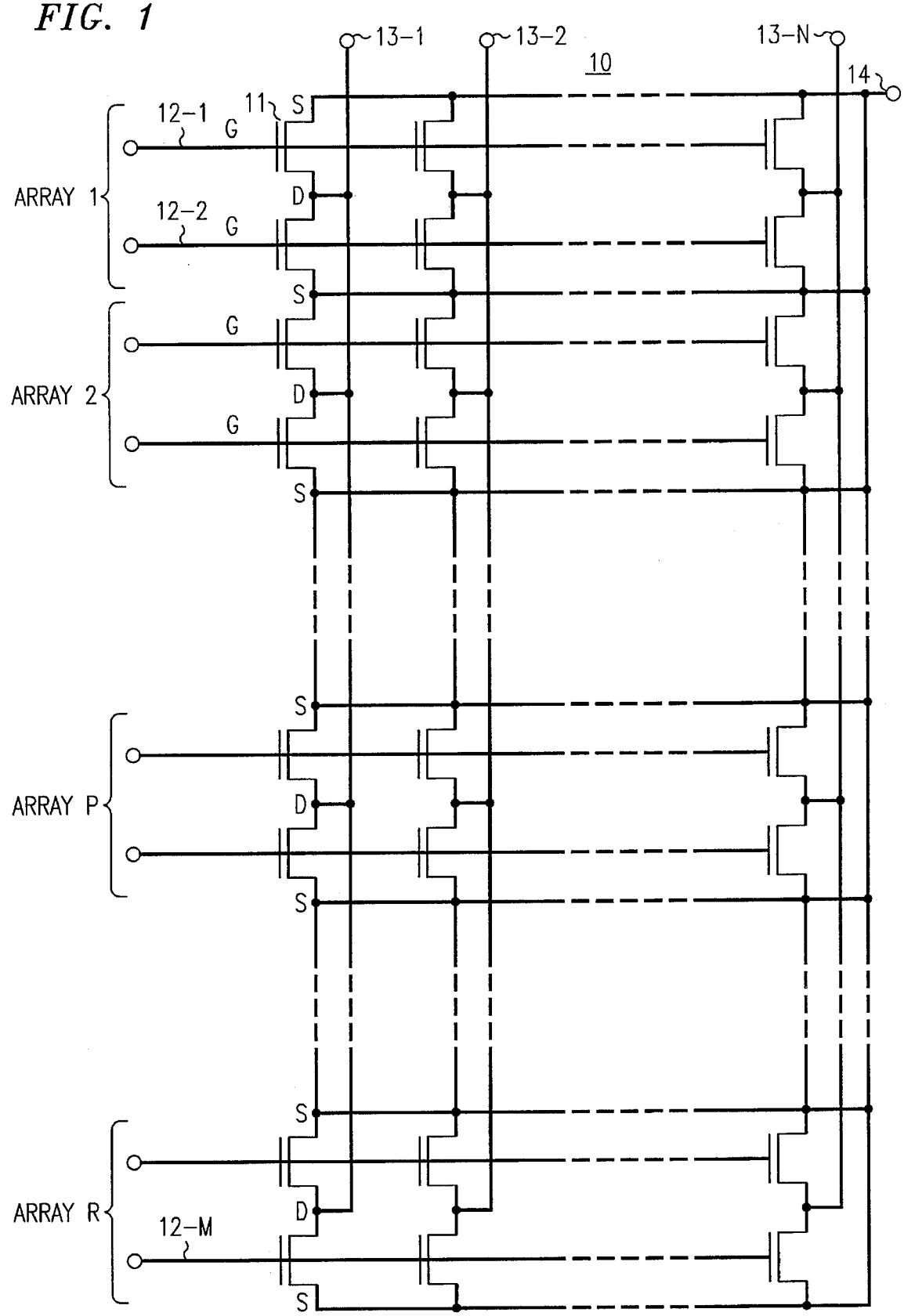
FIG. 1 is a circuit diagram of a standard FLASH memory device.

FIG. 1 illustrates a typical FLASH memory device 10 for nonvolatile storage which includes a plurality of memory cells. In this example, each cell comprises an MOS transistor, e.g., 11, with a source region designated S, a drain region designated D, and a gate electrode designated G. The cells are arranged in rows and columns, forming an array of M×N cells, only some of which are shown in the Figure. Each gate electrode of a row of transistors is coupled to a common word line (e.g., 12-1), while the drains of all transistors in a column are coupled to a common bit line (e.g., 13-1). The sources of all transistors in the array are coupled to a common source line 14.

For purposes of storing a plurality of data files, the M×N array of cells can be divided into an arbitrary number of arrays, each array storing a particular file. In this example, it is assumed that each file is stored in two contiguous rows of the memory. Hence, each array (labeled arrays 1, 2, P, R) consists of two contiguous rows of cells.

Figure 2:
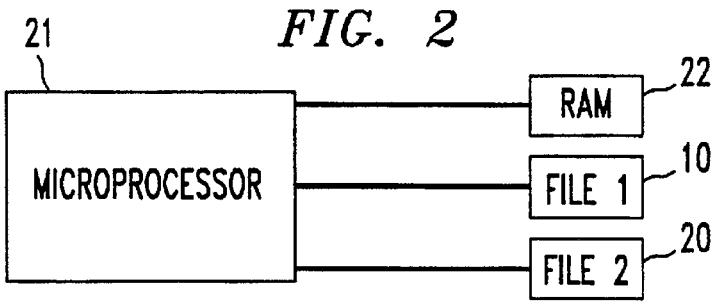
FIG. 2 is a block diagram of some components of the circuit in accordance with an embodiment of the invention.

FIG. 2 illustrates the basic components of the invention. The circuit includes at least one FLASH memory 10 and, if desired, a second FLASH memory 20, both of which are the type illustrated in FIG. 1. A microprocessor 21 is coupled to both FLASH memories. In addition, in accordance with this embodiment, a random access memory (RAM), 22, is also coupled to the microprocessor 21.

Figure 3:
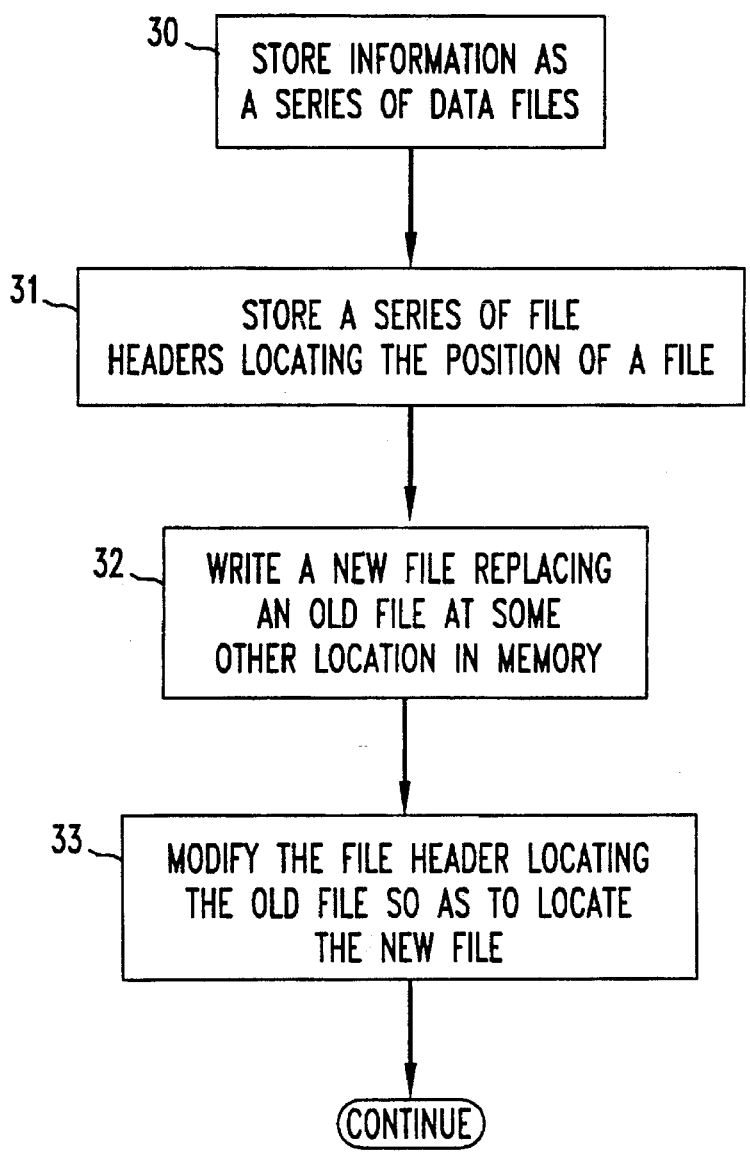
FIG. 3 is a flow diagram illustrating the operation of the invention in accordance with the same embodiment.

The operation of the circuit of FIGS. 1 and 2 will now be described with reference to the block diagrams of FIGS. 3 and 4. A series of data files is first written into the FLASH memory (10) as illustrated in step 30. These data files can include, for example, provisioning data for the channel units and other components in a digital loop carrier transmission system. Preferably, the data files are put into contiguous arrays of the FLASH device. Thus, for example, the initial files could be stored in arrays 1 to P–1 in FIG. 1, the latter array being the array (not shown) which is just above P in the FIG. At the same time, as illustrated by step 31, a series of file pointers is stored. Each file pointer includes one or more bytes of information which direct the microprocessor 21 to the location of a corresponding file. In this example, the file pointers are generated by the microprocessor 21 and stored in the RAM 22 for fast access to the files. Alternatively, the pointers could be stored in designated arrays in the FLASH memory itself.

When the information in a stored file needs to be changed, the file is not erased or written over as in previous schemes. Rather, as illustrated in step 32, the new file is written at some other location in the FLASH device. Preferably, the location is the first array which does not already include a file which, in this example, is array P of FIG. 1. Rather than erase the old file, the pointer for that file is changed to indicate that the most recent information (new file) is now located at array P of the FLASH device as illustrated by block 33. If another file is to be modified, or if a new file is to be added, the information will be placed in the next available array (P+1). Files can be updated, or new files added, any number of times as long as the corresponding pointers are updated or added and until all the memory arrays are used up.

Figure 4:
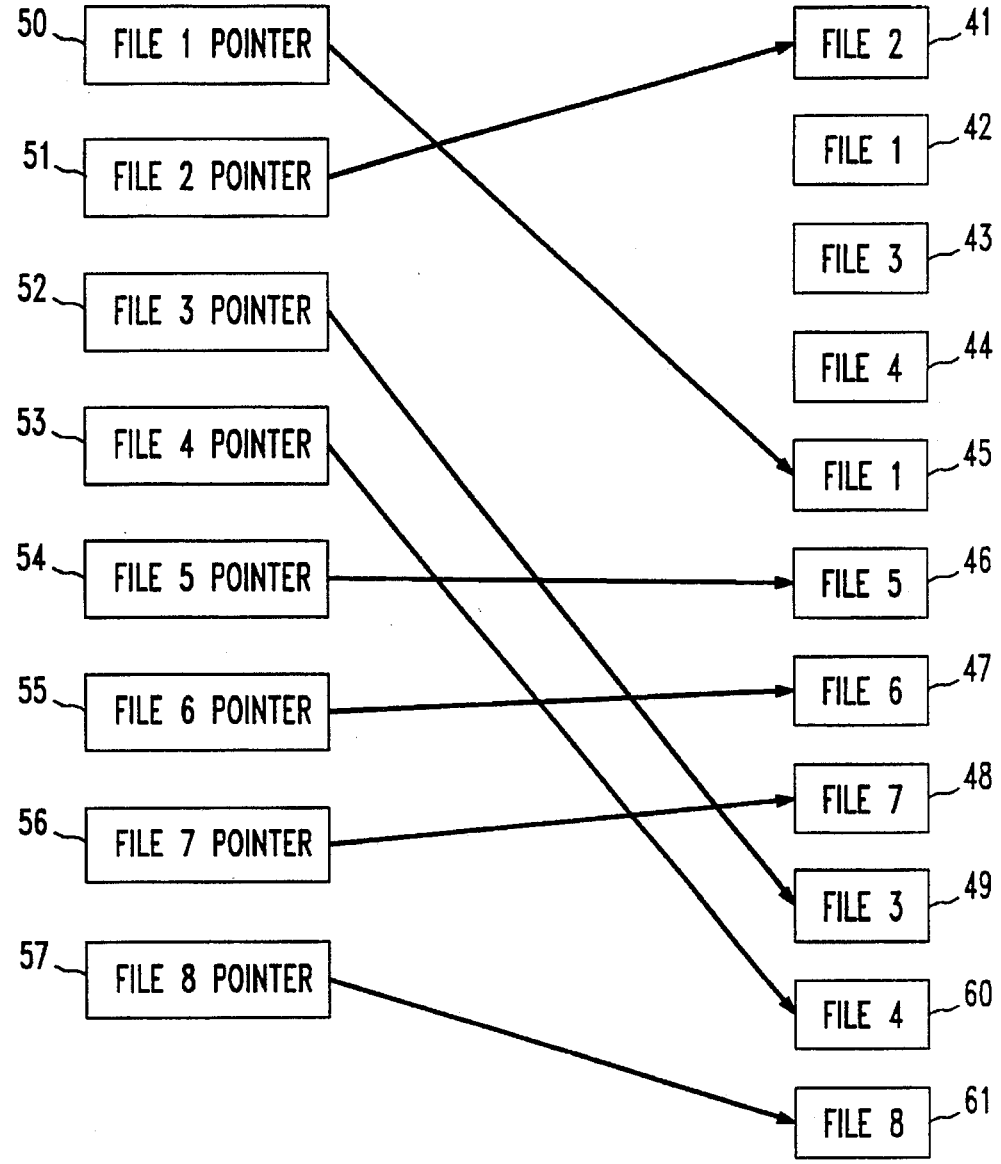
FIG. 4 is a block diagram illustrating certain features of the invention in accordance with the same embodiment.

FIG. 4 illustrates how a typical sequence of data files and pointers might develop. The left-hand column of blocks represents the file pointers stored in RAM and the right-hand column of blocks represents the files in FLASH memory. The arrows indicate the location of the most recent file information.

Thus, in this example, the FLASH memory starts with two files (blocks 40 and 41) and corresponding pointers (blocks 50 and 51) stored in RAM. In the next contiguous array, file 1 was rewritten (block 42). At the time of writing, the file 1 pointer (block 50) would have been altered to point to this new location (block 42). The file 2 pointer (block 51) continues to locate file 2 in the same area (block 41) since file 2 was not updated in this example.

Subsequent to the initial updating of file 1, new files 3 and 4 (blocks 43 and 44) were added to contiguous arrays in the FLASH device, while new file pointers (block 52 and 53) were added into the RAM to locate these new files. Subsequently, file 1 was again updated (block 45) by writing the new data in the array contiguous to file 4. Again, the file pointer (50) was changed to locate the new file 1. As indicated by the arrow from blocks 50 to 45, the current information for file 1 still resides at this location.

Files 5, 6, and 7 (blocks 46, 47, 48) were then added to the FLASH device, while their corresponding pointers (blocks 54, 55, 56) were added to the RAM. As indicated by the arrows, these locations for files 5, 6 and 7 continue to include the most recent information.

Subsequent to the addition of files 5–7, file 3 was updated (block 49) by writing the new information in an array contiguous with file 7. The pointer for file 3 (block 52) was changed to point to this new location as containing the most recent information. As indicated by the arrow from block 52 to block 49, this location still contains the most recent version of file 3. Similarly, file 4 (block 60) was updated by writing the file in an array contiguous with updated file 3 (block 49) and the pointer (block 53) was modified to locate the most recent file 4 information. Finally, new file 8 was added (block 61) and its associated file pointer (block 57) was formed in RAM. This procedure continues until the FLASH memory (10) is filled.

Figure 5:
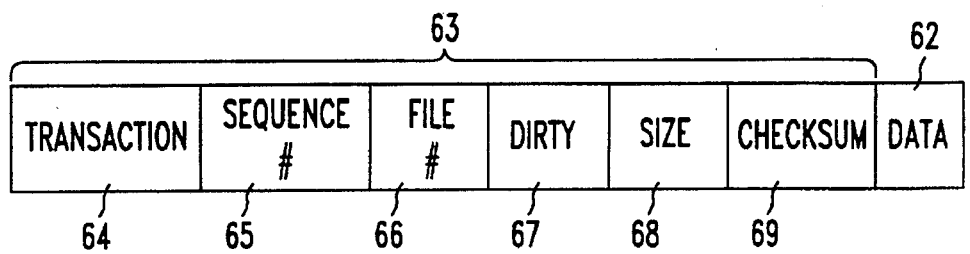
FIG. 5 is a block diagram illustrating the format for data files in accordance with the same embodiment.

FIG. 5 illustrates a file format in accordance with one embodiment of the invention. As shown, each file includes the stored data, 62, and a header, 63, which includes several fields, each including one or more bytes. The transaction portion, 64, indicates what type of transaction is stored in the data, i.e., whether the transaction spans more than one file, and whether the transaction was completed. This portion in combination with the sequence number portion 65 maintains transactional integrity by ensuring a means for determining if a transaction was completed prior to a power failure. The sequence number portion, 65, indicates the sequence of the file in the FLASH memory. For example, in FIG. 4, blocks 40–61 would have sequence numbers of 1–12 in the memory. Thus, the sequence number would increase by 1 for each new or revised file. The file number portion, 66, would indicate the number of the file regardless of its position in the memory. For example, blocks 40, 42 and 45 would all have a file number 1. However, the "dirty" portion, 67, would indicate if the data in the file was still current. For example, a current file could have a "dirty" byte of all "1s" and this would be changed to all "0s" when that file has been replaced by a current file somewhere else in the memory. The "dirty" portion is essential if the pointers are stored in RAM in order to reconstruct the pointers in the event of a power outage. However, this portion can be omitted if the pointers are stored in the FLASH memory itself. The size portion, 68, indicates the total number of bits in the file, and the checksum, 69, is the normal checksum byte for detecting errors in the file.

The format for the pointers (not shown) can simply be one or more bytes indicating the address of the files in the memory.

As the FLASH memory 10 gets close to capacity, use is made of FLASH memory 20. The current files (i.e., blocks 41, 45, 46, 47, 48, 49, 60 and 61 of FIG. 4) are duplicated in the FLASH memory 20 except that the sequence numbers will be changed to indicate the sequence of the file in both memories 10 and 20. That is, the first file written into memory 20 (e.g., block 41 of FIG. 4) will have a sequence number which is one more than the last file (e.g., block 61) in memory 10. The succeeding files in memory 20 will have successively increasing sequence numbers (e.g., block 45 of FIG. 4 will have a sequence number which is one greater than block 41 when copied into memory 20). If at some point the sequence numbers are not monotonically increasing, it will be realized that a file has been lost. In addition, in the event of a power outage, the microprocessor will be able to determine which memory is current based on the higher sequence number. After all the current files are copied into memory 20, the pointer table can be reconstructed by using the file number portion, 66, of the headers in order to point to the new locations of the files. Memory 10 can then be erased for subsequent reuse.

Memory 20 can then be used in place of memory 10 until memory 20 fills up, and the process can be repeated by copying the current files into memory 10.

A number of methods could be utilized to locate the next available location in the FLASH device for writing a new or updated file. A pointer could be kept in the RAM to indicate the next location. This pointer could be modified along with the appropriate file header as cell arrays are filled up. Alternatively, the microprocessor could traipse through the existing records or search backwards in the FLASH looking for an unerased byte.

Various additional modifications will become apparent to those skilled in the art. All such variations which basically rely on the teachings through which the invention has advanced the arts is properly considered within the scope of the invention.

We claim:

1. A circuit comprising:
   a nonvolatile FLASH memory device comprising arrays of memory cells;
   means for writing a plurality of first data files into a number of said arrays of cells;
   means for storing a series of file pointers each locating the position of the cell array which includes a particular one of the first files;
   means for writing a new data file at a previously unused cell array in order to update the information in one of the first data files; and
   means for modifying the pointer locating the updated first file to locate the new file.

2. The circuit according to claim 1 wherein the file pointers are stored in designated arrays of cells.

3. The circuit according to claim 1 wherein the file pointers are stored in a random access memory.

4. The circuit according to claim 1 further comprising a second FLASH memory to function as a back-up memory when the FLASH memory device approaches full capacity.

5. The circuit according to claim 1 wherein the means for writing the data files and modifying the file pointers comprises a microprocessor.

6. The circuit according to claim 1 wherein the circuit is adapted for storing data files in contiguous cell arrays and for placing new files in an unused array which is contiguous with an array already including a file.

7. The circuit according to claim 1 wherein the circuit is adapted to write a new file in a previously unused cell array each time it is desired to update an existing file.

8. The circuit according to claim 1 wherein the circuit is adapted to add a new file which does not update an existing file in a previously unused cell array which is contiguous with a cell array including an existing file.

9. A method for writing and storing information in a nonvolatile FLASH memory device which includes arrays of memory cells comprising the steps of:

writing a plurality of first data files into a number of said arrays of cells;

storing a series of file pointers, each locating the position of the cell array including a particular one of the first files;

writing a new data file at a previously unused cell array in order to update the information in one of the first data files; and modifying the file pointer locating the updated first file to locate the new file.

10. The method according to claim 9 wherein the file pointers are stored in the FLASH memory device.

11. The method according to claim 9 wherein the file pointers are stored in a random access memory.

12. The method according to claim 9 wherein the data files are also written into a second FLASH memory device when the FLASH device approaches full capacity.

13. The method according to claim 9 wherein the writing of the data files and modifying the file pointers are performed by a microprocessor.

14. The method according to claim 9 wherein the first data files are stored in contiguous arrays of memory cells, and the new data file is written into a memory cell which is contiguous with the last written data file.

15. The method according to claim 9 wherein a new file is written into a previously unused cell array each time it is desired to update an existing file.

16. The method according to claim 9 wherein a new file which does not update an existing file is written into a previously unused cell array which is contiguous with a cell array including an existing file.

* * * * *